(12) United States Patent
Sato

(10) Patent No.: US 11,077,715 B2
(45) Date of Patent: Aug. 3, 2021

(54) HEAVY-DUTY TIRE

(71) Applicant: Sumitomo Rubber Industries, Ltd., Kobe (JP)

(72) Inventor: Hana Sato, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 377 days.

(21) Appl. No.: 15/992,675

(22) Filed: May 30, 2018

(65) Prior Publication Data

US 2018/0361797 A1 Dec. 20, 2018

(30) Foreign Application Priority Data

Jun. 14, 2017 (JP) .............................. JP2017-117039
May 1, 2018 (JP) ................................. 2018-088299

(51) Int. Cl.
| | |
|---|---|
| *B60C 11/00* | (2006.01) |
| *B60C 3/04* | (2006.01) |
| *B60C 11/03* | (2006.01) |
| *B60C 11/01* | (2006.01) |
| *B60C 11/04* | (2006.01) |
| *B60C 11/12* | (2006.01) |

(52) U.S. Cl.
CPC ............ *B60C 11/0083* (2013.01); *B60C 3/04* (2013.01); *B60C 11/01* (2013.01); *B60C 11/0306* (2013.01); *B60C 11/042* (2013.01); *B60C 11/1236* (2013.01); *B60C 2011/013* (2013.01); *B60C 2011/0353* (2013.01); *B60C 2011/0355* (2013.01); *B60C 2011/129* (2013.01); *B60C 2200/06* (2013.01)

(58) Field of Classification Search
CPC . B60C 11/0083; B60C 11/00; B60C 2200/06; B60C 2200/065
See application file for complete search history.

(56) References Cited

U.S. PATENT DOCUMENTS 5,253,689 A * 10/1993 Sato ........................ B60C 11/00
152/454
5,616,195 A *  4/1997 Marquet ............... B60C 9/2009
152/209.14

(Continued)

FOREIGN PATENT DOCUMENTS

| JP | 60-179306 A | * | 9/1985 |
| JP | 07-164823 A |   | 6/1995 |

(Continued)

*Primary Examiner* — Steven D Maki
*Assistant Examiner* — Cedrick S Williams
(74) *Attorney, Agent, or Firm* — Birch, Stewart, Kolasch & Birch, LLP

(57) ABSTRACT

A heavy-duty tire includes a tread portion including a pair of tread edges and a tire equator located therebetween. In a tire cross-section including a tire axis under a 5% inner pressure condition where the tire is mounted on a standard wheel rim with 5% of a standard pressure but loaded with no tire load, the tread portion has a profile which includes a first profile including the tire equator, a pair of second profiles extending axially inwardly from the tread edges and a pair of third profiles connecting the first profile and the respective second profiles. The first profile and the second profiles are configured as arc shapes protruding outwardly in a tire radial direction, and the third profiles are configured as straight shapes.

14 Claims, 5 Drawing Sheets

(56) References Cited

U.S. PATENT DOCUMENTS

| | | | |
|---|---|---|---|
| 2004/0154716 A1* | 8/2004 | Kimishima | B60C 11/11 152/209.14 |
| 2005/0006018 A1* | 1/2005 | Maruoka | B60C 15/06 152/454 |
| 2006/0048875 A1* | 3/2006 | Carra | B60C 11/01 152/209.14 |
| 2007/0151646 A1* | 7/2007 | Ito | B60C 11/0306 152/209.25 |
| 2014/0332133 A1 | 11/2014 | Atake | |
| 2015/0174965 A1* | 6/2015 | Tanaka | B60C 11/0332 152/209.16 |

FOREIGN PATENT DOCUMENTS

| | | | |
|---|---|---|---|
| JP | 2013-112218 A | | 6/2013 |
| JP | 2013147076 A | * | 8/2013 |

\* cited by examiner

HEAVY-DUTY TIRE

BACKGROUND ART

Field of the Disclosure

The present disclosure relates to heavy-duty tires.

Description of the Related Art

Conventionally, the following patent literature 1, for example, discloses a heavy-duty tire which includes a tread profile configured as an arc-shaped first profile including the tire equator and a pair of arc-shaped second profiles located one on each side of the first profile in order to suppress uneven wear of the tread rubber.

Unfortunately, the heavy-duty tire disclosed in the patent literature 1 has a problem that uneven wear on the tread edges may occur since a ground contact pressure acting on the tread edges may increase when the difference between the first and second profiles is inadequate.

The following patent literature 2 discloses a heavy-duty tire which includes the second profiles each having a smaller radius of curvature than that a radius of curvature of the first profile.

Unfortunately, the heavy-duty tire disclosed in the patent literature 2 has a problem that shoulder wear and/or step wear on or around both ends of the second profiles may occur because the diameter differences on or around the ends of the second profiles tend to be large and which cause a slip of the both ends of the second profiles upon grounding.

[Patent Literature 1]
Japanese Unexamined Patent Application Publication 07-164823

[Patent Literature 2]
Japanese Unexamined Patent Application Publication 2013-112218

SUMMARY OF THE DISCLOSURE

In view of the above problems in the conventional art, the present disclosure has an object to provide heavy-duty tires capable of suppressing uneven wear on or around the tread edges.

According to one aspect of the disclosure, a heavy-duty tire includes a tread portion including a pair of tread edges and a tire equator located therebetween. In a tire cross-section including a tire axis under a 5% inner pressure condition where the tire is mounted on a standard wheel rim and inflated to 5% of a standard pressure but loaded with no tire load, the tread portion has a profile comprising a first profile including the tire equator, a pair of second profiles extending axially inwardly from the tread edges, and a pair of third profiles connecting the first profile and the respective second profiles. The first profile and the second profiles are configured as arc shapes protruding outwardly in a tire radial direction, and the third profiles are configured as straight shapes.

In another aspect of the disclosure, the second profiles each may have a radius of curvature $TR2$ greater than a radius of curvature $TR1$ of the first profile.

In another aspect of the disclosure, a ratio $TR2/TR1$ of the radius of curvature $TR2$ to the radius of curvature $TR1$ may be in a range of from 1.20 to 1.38.

In another aspect of the disclosure, on each side of the tire equator, the tread portion may be provided with a circumferentially and continuously extending shoulder main groove on a tread edge side to define a shoulder land portion disposed between the shoulder main groove and the tread edge, and on each side of the tire equator, a connecting point of the second profile and the third profile may be located on the shoulder land portion.

In another aspect of the disclosure, the shoulder land portion may be provided with a circumferentially and continuously extending shoulder auxiliary groove having a narrower width than that of the shoulder main groove to divide the shoulder land portion into a main portion on a side of the shoulder main groove and an auxiliary portion on a side of the tread edge, and on the main portion, a ratio $A3/A2$ of an axial length $A3$ of the third profile to an axial length $A2$ of the second profile may be from 4 to 9.

In another aspect of the disclosure, a depth of the shoulder auxiliary groove from a ground contact surface of the main portion may be equal to or less than 10 mm.

In another aspect of the disclosure, a heavy-duty tire includes a tread portion comprising a pair of tread edges and a tire equator located therebetween, the tread portion, on each side of the tire equator, being provided with a circumferentially and continuously extending shoulder main groove on a tread edge side to define a shoulder land portion disposed between the shoulder main groove and the tread edge. On each side of the tire equator, the shoulder land portion is provided with a circumferentially and continuously extending shoulder auxiliary groove having a narrower width than that of the shoulder main groove to divide the shoulder land portion into a main portion on a side of the shoulder main groove and an auxiliary portion on a side of the tread edge. In a tire cross-section including a tire axis under a 5% inner pressure condition where the tire is mounted on a standard wheel rim and inflated to 5% of a standard pressure but loaded with no tire load, the tread portion has a profile comprising a first profile including the tire equator, a pair of second profiles each extending axially inwardly from an axially outer end of the main portion, and a pair of third profiles connecting the first profile and the respective second profiles. The first profile and the second profiles are configured as arc shapes protruding outwardly in a tire radial direction, the third profiles are configured as straight shapes, and a ground contact surface of the auxiliary portion is located radially inwardly from a ground contact surface of the main portion at a distance of from 1 to 3 mm.

In another aspect of the disclosure, a ratio $A4/A1$ of an axial length $A4$ of the auxiliary portion to an axial length $A1$ of the main portion may be less than 0.20.

In another aspect of the disclosure, the shoulder land portion may be provided with a plurality of sipes extending axially outwardly from the shoulder main groove and terminating within the shoulder land portion.

In another aspect of the disclosure, an axial length of the plurality of shoulder sipes may be in a range of from 8% to 10% of an axial length $A1$ of the main portion.

In another aspect of the disclosure, the plurality of shoulder sipes may be regularly spaced apart from one another in a tire circumferential direction with a distance of from 15 to 18 mm.

In another aspect of the disclosure, the main portion includes an axially inner half region and an axially outer half region when the main portion is divided equally into two axial regions in the 5% inner pressure condition, and under a standard loaded condition where the tire is mounted on the standard wheel rim and inflated to the standard pressure and loaded with a standard tire load at zero camber angle on a plane, a ratio $P2/P1$ of an average ground contact pressure P2 of the outer half region to an average ground contact pressure P1 of the inner half region may be of from 0.80 to 0.90.

In another aspect of the disclosure, the main portion includes an axially inner shoulder region, an axially outer shoulder region, and an intermediate shoulder region between the inner shoulder region and the outer shoulder region when the main portion is divided equally into three axial regions in the 5% inner pressure condition, under the standard loaded condition, a ratio P3/P5 of a maximum ground contact pressure P3 of the inner shoulder region to a maximum ground contact pressure P5 of the intermediate shoulder region may be of from 1.10 to 1.50, and under the standard loaded condition, a ratio P5/P4 of the maximum ground contact pressure P5 to a maximum ground contact pressure P4 of the outer shoulder region may be of from 0.95 to 1.20.

DESCRIPTION OF THE PREFERRED EMBODIMENTS

An embodiment of the present disclosure will be explained below with reference to the accompanying drawings.

Figure 1:
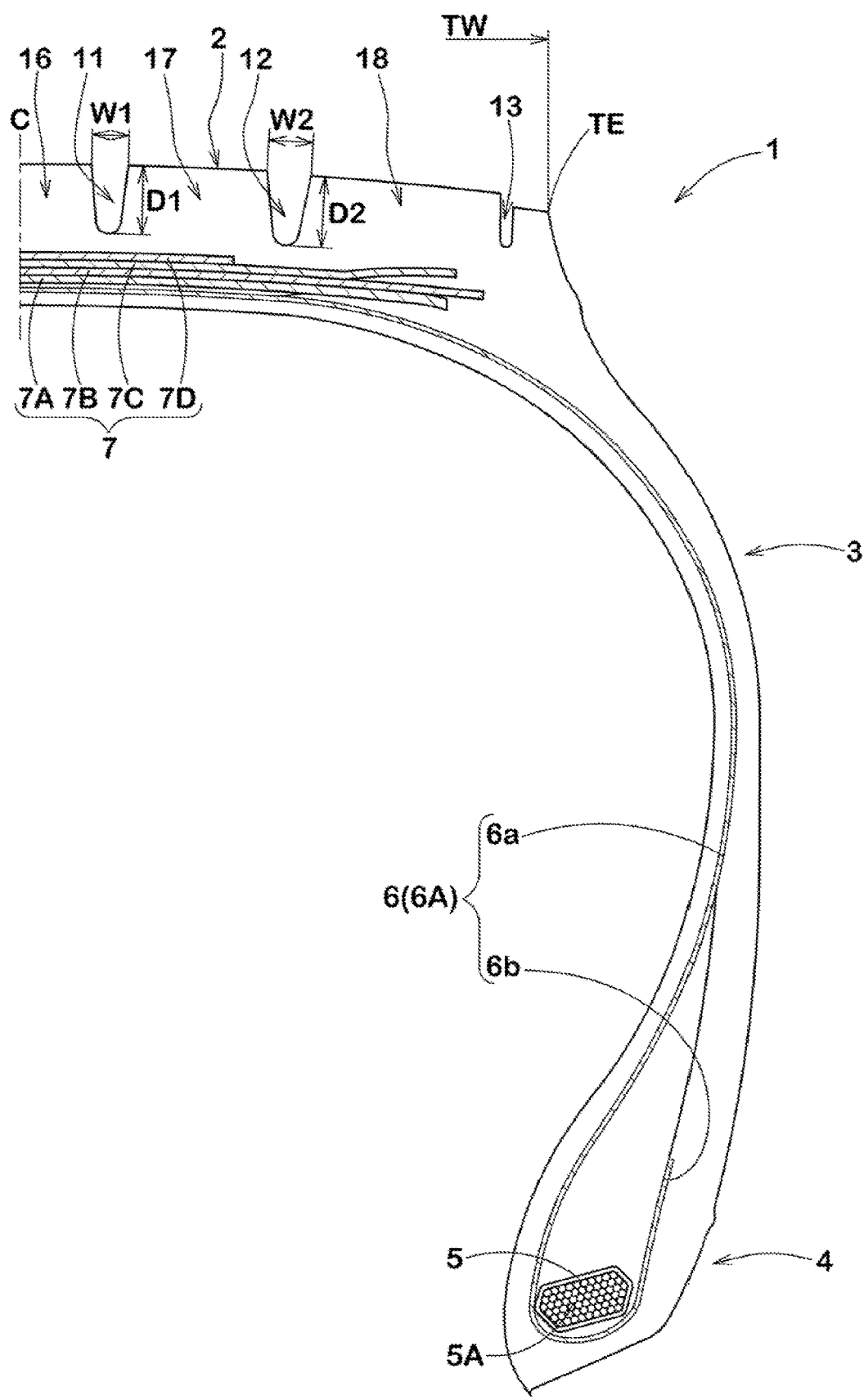
FIG. 1 is a cross-sectional view of a heavy-duty tire according to one embodiment of the present disclosure.

FIG. 1 illustrates a tire meridian cross-sectional view including a tire axis of a heavy-duty tire (hereinafter, simply referred to as "tire") 1 in accordance with one embodiment of the present disclosure under a standard condition. As used herein, the standard condition of the tire 1 is such that the tire 1 is mounted on the standard wheel rim and inflated to the standard pressure but loaded with no tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 includes a tread portion 2, a pair of sidewall portions 3, a pair of bead portions 4 each with a bead core 5 therein, a toroidal carcass 6 extending between the bead cores 5 through the tread portion 2 and the sidewall portions 3, and a belt layer 7.

The carcass 6, for example, is configured as one carcass ply 6A of steel cords which are oriented at angles of from 70 to 90 degrees with respect to the tire circumferential direction. The carcass ply 6A includes a main portion 6a extending between the pair of bead cores 5 and a pair of turn-up portions 6b turned up around the respective bead cores 5 from axially inside to the outside of the tire.

The belt layer 7 is disposed radially outwardly of the carcass 6 in the tread portion 2. The belt layer 7, for example, is configured as at least two belt plies of steel belt cords. In this embodiment, the belt layer 7 includes a four-layer structure which includes a first belt ply 7A of belt cords oriented at angles of 60 plus/minus 15 degrees with respect to the tire circumferential direction and the second to fourth belt plies 7B to 7D of belt cords oriented at angles of from 10 to 35 degrees with respect to the tire circumferential direction, for example.

The bead cores 5, for example, each are configured to have a core main body 5A with a polygonal cross-sectional shape (e.g. substantially a hexagonal cross section) which is made of steel bead wire wound multiply in the tire axial and radial directions.

The tread portion 2 is provided with a pair of circumferentially and continuously extending crown main grooves 11 located such that the tire equator C is therebetween, and a pair of circumferentially and continuously extending shoulder main grooves 12 each located axially outwardly of the crown main grooves 11.

In order to exert adequate drainage performance, groove widths W1 and W2 of the crown main grooves 11 and the shoulder main grooves 12, respectively, are preferably equal to or more than 3% of the tread width TW. Similarly, depths D1 and D2 of the crown main grooves 11 and the shoulder main grooves 12, respectively are preferably equal to or more than 8 mm.

Note that the tread width TW is the axial distance between the tread edges TE.

By the crown main grooves 11 and the shoulder main grooves 12, the tread portion 2 is divided into a crown land portion 16 between the pair of crown main grooves 11, a pair of middle land portions 17 each between adjacent one crown main groove 11 and one shoulder main groove 12 on each side of the tire equator C, and a pair of shoulder land portions 18 disposed axially outwardly of the shoulder main grooves 12.

Figure 2:
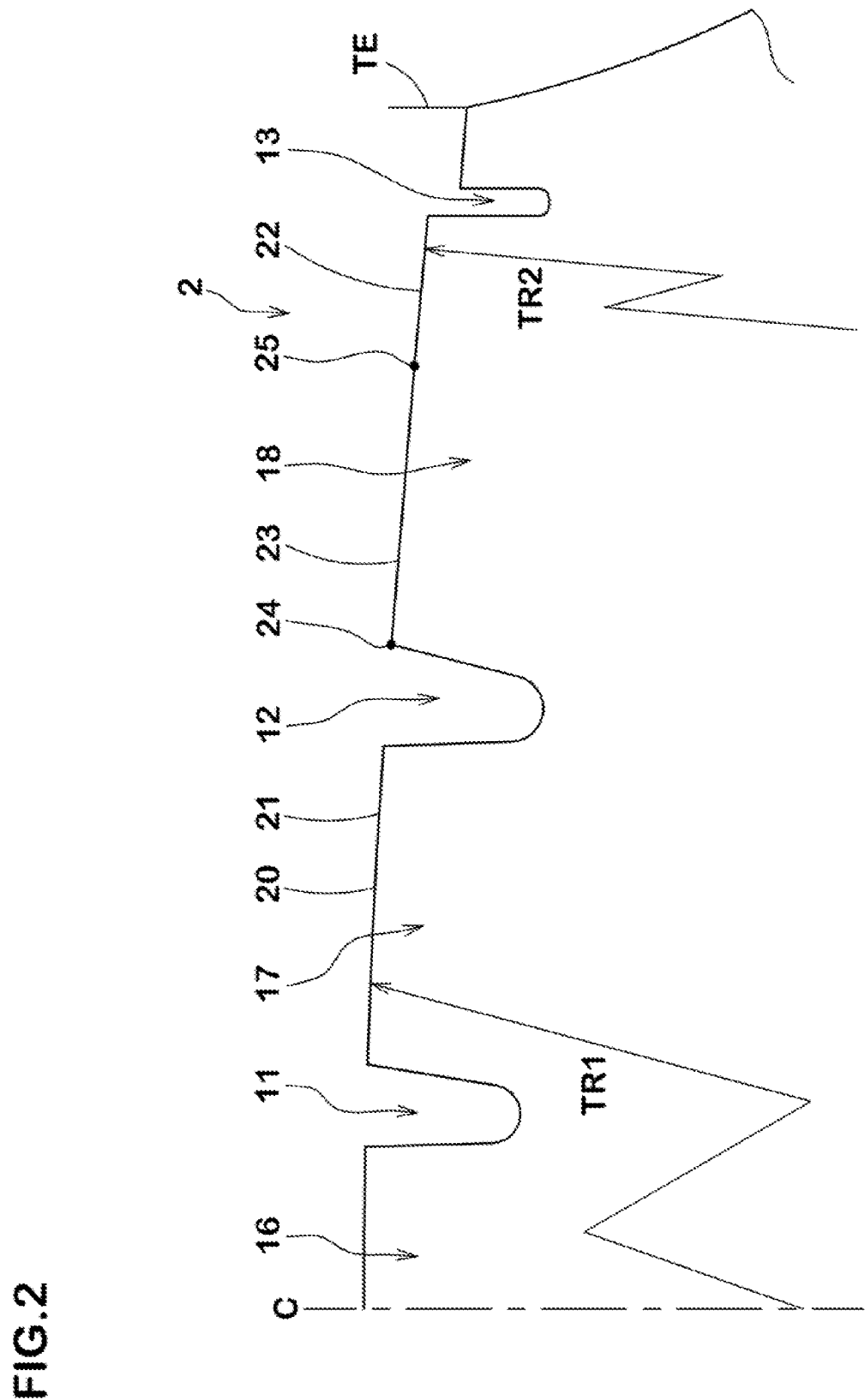
FIG. 2 is a partial enlarged view of a tread portion of FIG. 1.

FIG. 2 illustrates a tire meridian cross-sectional view including the tire axis of the tire 1 under a 5% inner pressure condition where the tire 1 is mounted on the standard wheel rim and inflated to 5% of the standard pressure but loaded with no tire load, In this application including specification and claims, various dimensions, positions and the like of the tire 1 refer to those under the 5% inner pressure condition of the tire unless otherwise noted.

Figure 3:
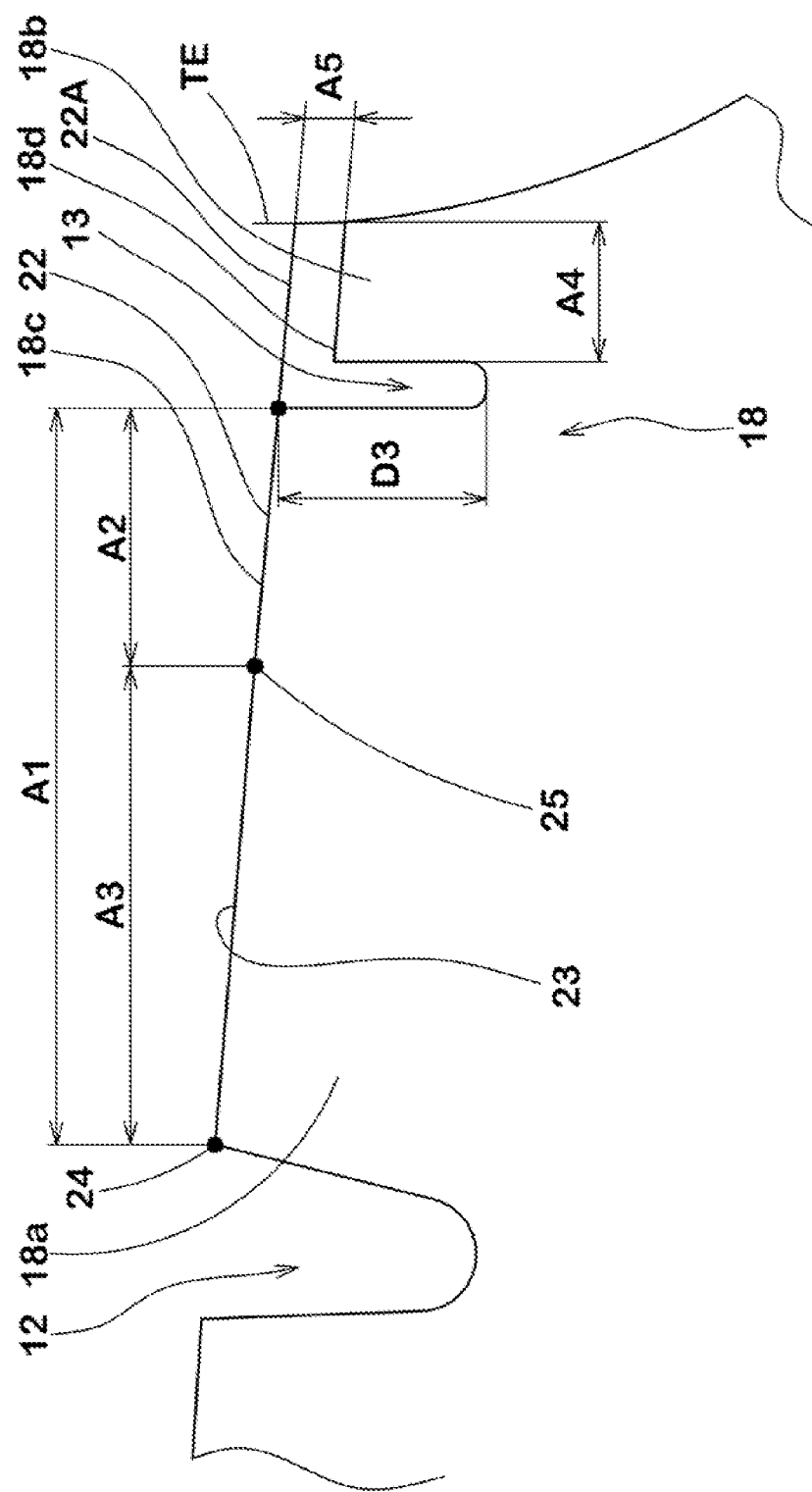
FIG. 3 is a partial enlarged view of a shoulder land portion of FIG. 2.

The tread portion 2 has a profile 20 which comprises a first profile 21 including the tire equator C, a pair of second profiles 22 extending axially inwardly from the tread edges TE (i.e., FIG. 3 illustrates one of the second profiles 22 which extends from the tread edge TE to a connecting point 25) and a pair of third profiles 23 connecting the first profile 21 and the respective second profiles 23.

The first profile 21 and the second profiles 22 are configured as arc shapes protruding outwardly in a tire radial direction. On the other hand, the third profiles 23 are configured as straight shapes.

Preferably, on each side of the tire equator C, the first profile 21 and the third profile 23 are connected at a connecting point 24 smoothly from one another. Preferably, on each side of the tire equator C, the third profile 23 and the second profile 22 are connected at a connecting point 25 smoothly from one another.

By providing the first profile 21 and the second profiles 22 having arc shapes and the third profiles 23 having straight shapes, the profile 20 of the tread portion 2 extending from the first profile 21 to the respective second profiles 22 through the third profiles 23 is continuous smoothly. Thus, in a localized area around the connecting point 24 as well as a localized area around the connecting point 25, the diameter difference of the tread portion 2 tends to be small, resulting in suppressing shoulder wear and/or step wear. Further, the second profiles 22 having an arc shapes can lower the ground contact pressure acting on or around the tread edges TE, resulting in suppressing shoulder wear.

Preferably, the second profiles 22 each have a radius of curvature TR2 greater than a radius of curvature TR1 of the first profile 21. Thus, the diameter difference on a localized area around the tread edges TE tends to be small further, resulting in suppressing shoulder wear.

Preferably, a ratio TR2/TR1 of the radius of curvature TR2 to the radius of curvature TR1 is in a range of from 1.20 to 1.38 in order to minimize the diameter difference in a localized area on or around the tread edges TE as well as to reduce round contact pressure acting on or around the tread edges TE surely.

The shoulder main grooves 12 are the main grooves which are located proximate to the respective tread edges TE. On each side of the tire equator C, a circumferentially and continuously extending shoulder land portion 18 is disposed between the shoulder main groove 12 and the tread edge TE.

Preferably, the connecting point 24 of the first profile 21 and the third profile 23, on each side of the tire equator C, is located in the shoulder main groove 12 or on the axially innermost point of the shoulder land portion 18. Thus, the ground contact surface of the tread portion 2 are smoothly continuous, resulting in suppressing shoulder wear.

Preferably, the connecting point 25 of the second profile 22 and the third profile 23, on each side of the tire equator C, is located on the shoulder land portion 18. Thus, the diameter difference of a localized area on or around the tread edges TE tends to be small, resulting in suppressing shoulder wear.

FIG. 3 illustrates a partial enlarged view of the shoulder land portion of FIG. 2. The shoulder land portion 18, on each side of the tire equator C, is provided with a shoulder auxiliary groove 13. The shoulder auxiliary groove 13 extends continuously in the tire circumferential direction with a width narrower than that of the shoulder main groove 12. By the shoulder auxiliary groove 13, the shoulder land portion 18 is divided into a main portion 18a on a side of the shoulder main groove 12 and an auxiliary portion 18b on a side of the tread edge TE. In one aspect where the shoulder auxiliary groove 13 is not provided, note that each of the second profiles 22 further including a portion 22A that extends to the tread edge TE, as illustrated in FIG. 3.

Since the auxiliary portion 18b can ground to support a part of the tire load acting on the shoulder land portion 18, a ground contact pressure acting on an axially outer edge of the main portion 18a can be reduced, resulting in suppressing shoulder wear.

On the main portion 18a, a ratio A3/A2 of an axial length A3 of the third profile 23 to an axial length A2 of the second profile 22 is preferably of from 4 to 9 in order to further improve suppressing shoulder wear.

When the ratio A3/A2 is set into the above range, the shoulder wear can be further suppressed by being minimized the diameter difference in a localized area of the axially outer end of the main portion 18a as well as by reducing the ground contact pressure acting on the axially outer edge of the main portion 18a.

A ratio A4/A1 of an axial length A4 of the auxiliary portion 18b to an axial length A1 of the main portion 18a is preferably less than 0.20. When the ratio A4/A1 exceeds 0.20, rigidity of the auxiliary portion 18b tends to be higher excessively, and which may cause a slip of an axially outer portion of the ground contact surface 18c of the main portion 18a upon grounding. Thus, there may be a possibility that shoulder wear occurs.

Preferably, then axial length A4 of the ground contact surface 18d of the auxiliary portion 18b is equal to or less than the axial length A2 of the second profiles 22. When the length A4 exceeds the length A2, rigidity of the auxiliary portion 18b tends to be higher excessively, and which may cause a slip of an axially outer portion of the ground contact surface 18c of the main portion 18a upon grounding. Thus, there may be a possibility that shoulder wear occurs.

Preferably, a depth D3 of the shoulder auxiliary groove 13 is equal to or less than 10 mm from the ground contact surface 18c of the main portion 18a. When the depth D3 of the shoulder auxiliary groove 13 exceeds 10 mm, rigidity of the auxiliary portion 18b tends to be insufficient. Thus, the effect that the auxiliary portion 18b supports a part of tire load acting on the shoulder land portion 18 becomes lower, and there may be a possibility that shoulder wear occurs.

Preferably, the ground contact surface 18d of the auxiliary portion 18b is located radially inwardly from the ground contact surface 18c of the main portion 18a at a distance A5 of from 1 to 3 mm. In this aspect, on each side of the tire equator C, the second profile 22 extends axially inwardly form the axially outer end of the main portion 18a.

When the distance A5 is less than 1 mm, an axially outer portion around the ground contact surface 18c tends to slip upon grounding, and there may be a possibility that shoulder wear occurs. When the distance A5 exceeds 3 mm, the effect that the auxiliary portion 18b supports a part of tire load acting on the shoulder land portion becomes insufficient, and there may be a possibility that shoulder wear occurs.

Figure 4:
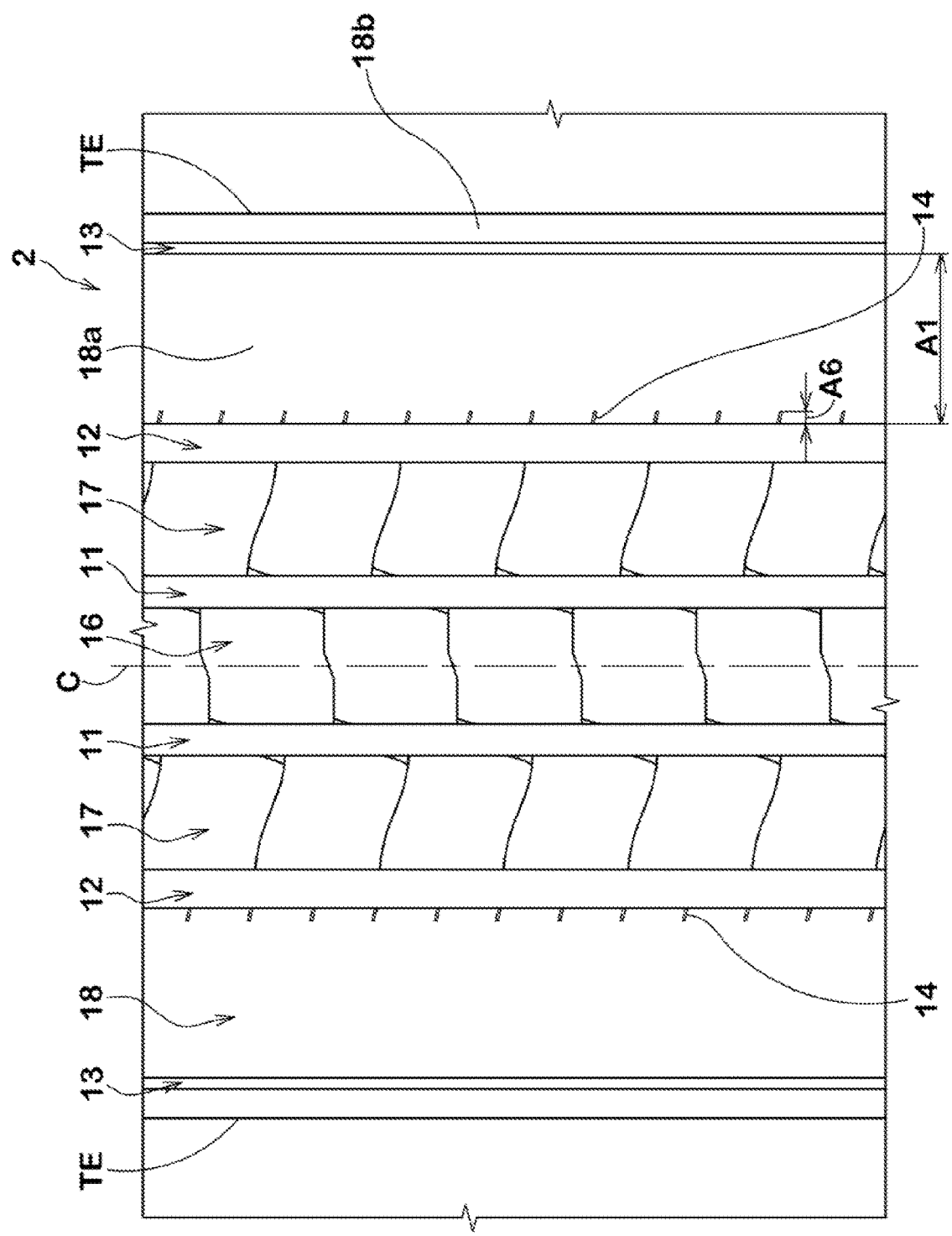
FIG. 4 is a development view of the tread portion of FIG. 1.

FIG. 4 illustrates a development view of the tread portion 2. In this embodiment, the crown main grooves 11, the shoulder main grooves 12 and the shoulder auxiliary grooves 13 extend in a straight manner parallel with the tire circumferential direction. Alternately, one or more grooves 11 to 13 may extend in a zigzag manner in the tire circumferential direction.

The crown land portion 16 and the middle land portions 17 each are provided with lateral grooves or sipes extending in the tire axial direction.

The shoulder land portions 18 are not provided with any axially extending lateral grooves. Thus, high rigidity of the shoulder land portions 18 can be maintained, resulting in suppressing uneven wear of the shoulder land portions 18.

The shoulder land portions 18 are provided with a plurality of shoulder sipes 14 extending axially outwardly from the shoulder main grooves 12 and having terminal ends within the shoulder land portions 18. Due to the shoulder sipes 14, the ground contact pressure acting on an axially inner portion of the shoulder land portions 18 can be dispersed, leading to suppress step wear thereon.

Preferably, axial length A6 of the shoulder sipes 14 are in a range of from 8% to 10% of axial lengths A1 of the main portions 18a.

By setting the lengths A6 of the shoulder sipes 14 into the above range, shoulder wear and step wear can be further suppressed since when the lengths A6 are equal to or more than 8% of the lengths A1 of the main portions 18a, the effect that disperses the ground contact pressure acting on the main portions 18a can further be improved and since when the lengths A6 are equal to or less than 10% of the lengths A1 of the main portions 18a, high rigidity of the main portions 18a can surely be maintained.

Preferably, the shoulder sipes 14 are regularly spaced apart from one another in the tire circumferential direction at a distance of from 15 to 18 mm.

When the distance of the shoulder sipes 14 is set equal to or more than 15 mm, sufficient rigidity of axially inner portions of the main portions 18a can be maintained. When the distance of the shoulder sipes 14 is equal to or less than 18 mm, the effect that disperses the ground contact pressure acting on the axially inner portions of the main portions 18a can be improved. Therefore, the shoulder wear and step wear can further be suppressed.

Figure 5:
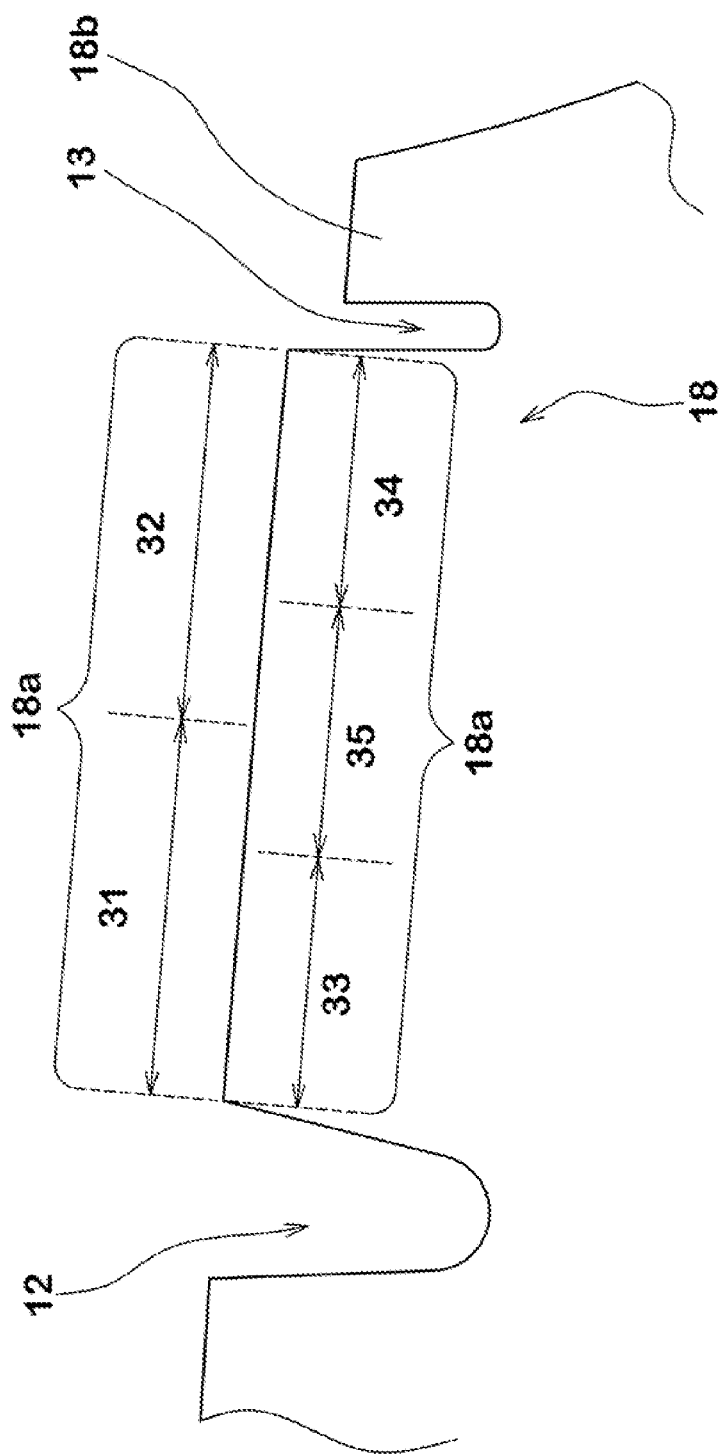
FIG. 5 is a partial enlarged view of the shoulder land portion of FIG. 2.

FIG. 5 illustrates one shoulder land portion 18 under the 5% inner pressure condition. The main portion 18a under the 5% inner pressure condition includes an axially inner half region 31 and an axially outer half region 32 when the main portion 18a is divided equally into two axial regions in the 5% inner pressure condition.

Under a standard loaded condition, a ratio P2/P1 of an average ground contact pressure P2 of the outer half region 32 to an average ground contact pressure P1 of the inner half region 31 is preferably of from 0.80 to 0.90. As used herein the "standard loaded condition" is such that the tire 1 is mounted on the standard wheel rim and inflated to the standard pressure and loaded with a standard tire load at zero camber angle on a plane.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

When the ratio P2/P1 is set equal to or more than 0.80, a slip of the outer half region 32 can surely be prevented upon grounding. When the ratio P2/P1 is set equal to or less than 0.90, excessive increase of the ground contact pressure acting on the outer half region 32 can surely be prevented. Therefore, shoulder wear can further be suppressed.

The main portion 18a includes an axially inner shoulder region 33, an axially outer shoulder region 34, and an intermediate shoulder region 35 between the inner shoulder region 33 and the outer shoulder region 34 when the main portion 18a is divided equally into three axial regions in the 5% inner pressure condition.

Under the standard loaded condition, a ratio P3/P5 of the maximum ground contact pressure P3 of the inner shoulder region 33 to the maximum ground contact pressure P5 of the intermediate shoulder region 35 is preferably of from 1.10 to 1.50.

When the ratio P3/P5 is set equal to or more than 1.10, a slip of the inner shoulder region 33 can be surely reduced upon grounding. When the ratio P3/P5 is set equal to or less than 1.50, excessive increase of the ground contact pressure acting on an axially inner region 33 of the main portion 18a can surely be prevented. Therefore, step wear can further be suppressed.

Under the standard loaded condition, a ratio P5/P4 of the maximum ground contact pressure P5 to the maximum ground contact pressure P4 of the outer shoulder region 34 is preferably of from 0.95 to 1.20.

When the ratio P5/P4 is equal to or more than 0.95, excessive increase of the ground contact pressure acting on an axially outer region 34 of the main portion 18a can surely be prevented. When the ratio P5/P4 is equal to or less than 1.20, the slip of the outer shoulder region 34 can be reduced upon grounding.

While the particularly preferable embodiments in accordance with the present disclosure have been described in detail, the present disclosure is not limited to the illustrated embodiments but can be modified and carried out in various aspects.

Example

Heavy-duty tires 12R22.5 with a basic tread pattern as shown in FIG. 1 were manufactured by way of trial based on the specification in Table 1. Then, uneven wear resistance of each test tire was tested. The testing method of the test tires are as follows.

Uneven Wear Resistance Test:

Each test tire was mounted on front wheels of a high-speed buss using a rim of 8.25×22.5 with an inner pressure of 800 kPa, and then was made to run for six months without performing tire rotation. Then, shoulder wear and step wear on the shoulder land portions was evaluated with the naked eyes. The test results are shown in Table 1 using a score system wherein the Ex. 1 is set to 100.

TABLE 1

|  | Ref. 1 | Ref. 2 | Ex. 1 | Ex. 2 | Ex. 3 | Ex. 4 |
| --- | --- | --- | --- | --- | --- | --- |
| First profile | arc shape | arc shape | arc shape | arc shape | arc shape | arc shape |
| Second profiles | arc shapes | arc shapes | arc shapes | arc shapes | arc shapes | arc shapes |
| Third profiles | none | none | straight shapes | straight shapes | straight shapes | straight shapes |
| Ratio TR2/TR1 | 0.8 | 1.4 | 1.3 | 0.8 | 1.1 | 1.2 |
| Ratio A3/A2 | — | — | 7 | 7 | 7 | 7 |
| Uneven wear resistance (score) | 60 | 70 | 100 | 80 | 90 | 95 |

|  | Ex. 5 | Ex. 6 | Ex. 7 | Ex. 8 | Ex. 9 | Ex. 10 |
| --- | --- | --- | --- | --- | --- | --- |
| First profile | arc shape | arc shape | arc shape | arc shape | arc shape | arc shape |
| Second profiles | arc shapes | arc shapes | arc shapes | arc shapes | arc shapes | arc shapes |
| Third profiles | straight shapes | straight shapes | straight shapes | straight shapes | straight shape | straight shape |
| Ratio TR2/TR1 | 1.38 | 1.4 | 1.3 | 1.3 | 1.3 | 1.3 |
| Ratio A3/A2 | 7 | 7 | 2 | 4 | 9 | 15 |
| Uneven wear resistance (score) | 95 | 90 | 90 | 95 | 95 | 90 |

As apparent from Table 1, it is confirmed that the example heavy-duty tires improved uneven wear resistance significantly as compared to the reference tires.

What is claimed is:

1. A heavy-duty tire comprising:
a tread portion comprising a pair of tread edges and a tire equator located therebetween, wherein
in a tire cross-section including a tire axis under a 5% inner pressure condition where the tire is mounted on a standard wheel rim and inflated to 5% of a standard pressure but loaded with no tire load,
the tread portion has a profile comprising a first profile including the tire equator, a pair of second profiles extending axially inwardly from the tread edges, and a pair of third profiles connecting the first profile and the respective second profiles,
wherein
the first profile and the second profiles are configured as arc shapes protruding outwardly in a tire radial direction having respective centers internal to the tire, and the third profiles are configured as straight shapes,
wherein:
the tread portion is provided with a pair of circumferentially and continuously extending crown main grooves located such that the tire equator C is therebetween, and a pair of circumferentially and continuously extending shoulder main grooves located axially outwardly of the crown main grooves to form a crown land portion between the pair of crown main grooves, a pair of middle land portions between the crown main grooves and shoulder main grooves, and a pair of shoulder land portions disposed axially outwardly of the shoulder main grooves,
radially outer surfaces of the crown land portion and the pair of middle land portions consist of the first profile,
the pair of shoulder land portions includes the respective tread edges, and
a radially outer surface of each of the pair of shoulder land portions consists of the third profile and the second profile that extends from the tread edge to the third profile,
wherein
on each side of the tire equator, a connecting point of the second profile and the third profile is located on the shoulder land portion,
wherein
the shoulder land portion is provided with a circumferentially and continuously extending shoulder auxiliary groove having a narrower width than that of the shoulder main groove to divide the shoulder land portion into a main portion on a side of the shoulder main groove and an auxiliary portion on a side of the tread edge, and
on the main portion, a ratio A3/A2 of an axial length A3 of the third profile to an axial length A2 of the second profile is from 4 to 9, and
wherein
the main portion comprises an axially inner half region and an axially outer half region when the main portion is divided equally into two axial regions in the 5% inner pressure condition, and
under a standard loaded condition where the tire is mounted on the standard wheel rim and inflated to the standard pressure and loaded with a standard tire load at zero camber angle on a plane, a ratio P2/P1 of an average ground contact pressure P2 of the outer half region to an average ground contact pressure P1 of the inner half region is of from 0.80 to 0.90.

2. The heavy-duty tire according to claim 1, wherein
the main portion comprises an axially inner shoulder region, an axially outer shoulder region, and an intermediate shoulder region between the inner shoulder region and the outer shoulder region when the main portion is divided equally into three axial regions in the 5% inner pressure condition,
under the standard loaded condition, a ratio P3/P5 of a maximum ground contact pressure P3 of the inner shoulder region to a maximum ground contact pressure P5 of the intermediate shoulder region is of from 1.10 to 1.50, and
under the standard loaded condition, a ratio P5/P4 of the maximum ground contact pressure P5 to a maximum ground contact pressure P4 of the outer shoulder region is of from 0.95 to 1.20.

3. The heavy-duty tire according to claim 1, wherein
a ratio A4/A1 of an axial length A4 of the auxiliary portion to an axial length A1 of the main portion is less than 0.20.

4. The heavy-duty tire according to claim 3, wherein
the shoulder land portion is provided with a plurality of sipes extending axially outwardly from the shoulder main groove and terminating within the shoulder land portion.

5. The heavy-duty tire according to claim 1, wherein
the shoulder land portion is provided with a plurality of sipes extending axially outwardly from the shoulder main groove and terminating within the shoulder land portion.

6. The heavy-duty tire according to claim 5, wherein
an axial length of the plurality of shoulder sipes is in a range of from 8% to 10% of an axial length A1 of the main portion.

7. The heavy-duty tire according to claim 5, wherein
the plurality of shoulder sipes is regularly spaced apart from one another in a tire circumferential direction with a distance of from 15 to 18 mm.

8. The heavy-duty tire according to claim 1, wherein
a depth of the shoulder auxiliary groove from a ground contact surface of the main portion is equal to or less than 10 mm.

9. The heavy-duty tire according to claim 8, wherein
a ratio A4/A1 of an axial length A4 of the auxiliary portion to an axial length A1 of the main portion is less than 0.20.

10. The heavy-duty tire according to claim 8, wherein
the shoulder land portion is provided with a plurality of sipes extending axially outwardly from the shoulder main groove and terminating within the shoulder land portion.

11. The heavy-duty tire according to claim 1, wherein
the second profiles each have a radius of curvature TR2 greater than a radius of curvature TR1 of the first profile.

12. The heavy-duty tire according to claim 11, wherein
on each side of the tire equator, a connecting point of the second profile and the third profile is located on the shoulder land portion.

13. The heavy-duty tire according to claim 11, wherein
a ratio TR2/TR1 of the radius of curvature TR2 to the radius of curvature TR1 is in a range of from 1.20 to 1.38.

14. The heavy-duty tire according to claim 13, wherein on each side of the tire equator, a connecting point of the second profile and the third profile is located on the shoulder land portion.

\* \* \* \* \*